United States Patent [19]

Moriya et al.

[11] 3,797,976
[45] Mar. 19, 1974

[54] OIL SEAL DEVICE FOR ROTARY PISTON INTERNAL COMBUSTION ENGINE

[75] Inventors: Sakai Moriya, Urawa; Shoji Suzuki, Tokyo; Noriyuki Kurio, Hiroshima, all of Japan

[73] Assignee: Nippon Piston Ring Co., Ltd., Tokyo, Japan

[22] Filed: Oct. 16, 1972

[21] Appl. No.: 298,174

[30] Foreign Application Priority Data
Oct. 21, 1971 Japan.................. 46-96768

[52] U.S. Cl.................... 418/142, 277/92
[51] Int. Cl............................ F01c 19/12
[58] Field of Search............ 418/61, 142; 123/8.01; 277/92

[56] References Cited
UNITED STATES PATENTS

| 3,309,011 | 3/1967 | Osakada et al. | 418/142 |
| 3,456,624 | 7/1969 | Okamoto | 418/142 |
| 3,506,275 | 4/1970 | Moriyama | 418/142 X |

*Primary Examiner*—C. J. Husar
*Assistant Examiner*—Leonard Smith
*Attorney, Agent, or Firm*—Sughrue, Rothwell, Mion, Zinn & Macpeak

[57] ABSTRACT

An oil seal device of a rotary piston internal combustion engine whose rotor is formed with one or more oil seal grooves, has a spring disposed within the bottom of the oil seal groove of the rotor and has an intermediate ring provided with a seal element formed of rubber or synthetic resin at least on the inner and outer periphery thereof, disposed between the rear surface of an oil seal body and the spring.

8 Claims, 7 Drawing Figures

OIL SEAL DEVICE FOR ROTARY PISTON INTERNAL COMBUSTION ENGINE

BACKGROUND OF THE INVENTION

1. Field of the Invention

This invention relates to improvements in an oil seal device used in a rotary piston internal combustion engine.

2. Description of the Prior Art

In known oil seal devices, an oil seal body, O-ring and spring are inserted into the annular groove formed on the thrust surface of the rotor eccentrically rotating in a center housing having trochoidal curved surface, and the oil seal body is urged against the inner wall surface of the side housing by the tension of the spring. The action of the O-ring is to prevent the oil from flowing into the combustion chamber in order not to introduce various bad effects such as seizure of side seal due to the combustion of the oil. However, there exists some leakage of the oil into the combustion chamber which actually introduces the various bad effects thereto.

SUMMARY OF THE INVENTION

This invention eliminates the aforementioned disadvantages of such conventional devices and provides a novel and improved oil seal device for a rotary piston internal combustion engine.

It is, therefore, an object of the present invention to provide an oil seal device for a rotary piston internal combustion engine which effectively prevents oil from leaking into the combustion chamber.

It is another object of the present invention to provide an oil seal device for a rotary piston internal combustion engine with no fear of wear even by using a seal element of rubber or synthetic resin on all surfaces of the reinforcement ring.

According to one aspect of the present invention, there is provided an oil seal device for a rotary piston internal combustion engine having a rotor formed with one or more oil seal grooves and a spring disposed on the bottom of the oil seal groove of the rotor, which comprises an intermediate ring provided with a seal element formed of rubber or synthetic resin, at least on the inner and outer periphery thereof, and disposed between the rear surface of the oil seal body and the spring.

These and other objects, features and advantages of the present invention will become apparent from the following description taken in conjunction with the accompanying drawings.

DESRIPTION OF PREFERRED EMBODIMENTS

Figure 1:
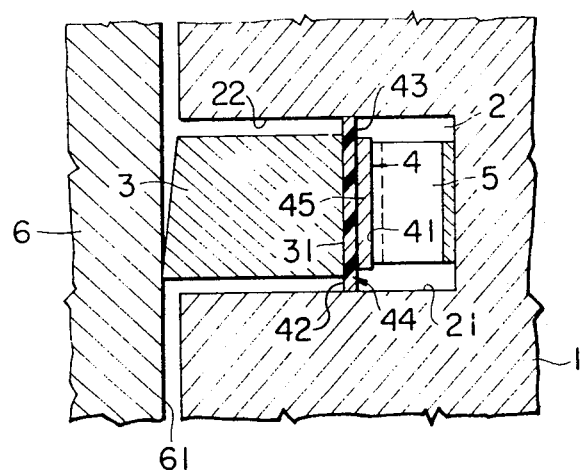
FIG. 1 is an enlarged longitudinal sectional view of the essential parts of a rotary piston internal combustion engine mounted employing the oil seal of the present invention.

In the oil seal device of the present invention, as shown in FIG. 1, the oil seal body 3 is inserted into an annular oil seal groove 2 formed within the sidewall thrust surface of a rotor 1, and an intermediate ring 4 is provided on the rear surface 31 of the oil seal body 3. Further. on the rear surface 41 of the intermediate ring 4 is provided a spring 5, the tension of which urges the body 3 of the oil seal against the inner wall 61 of the side housing 6. Since the intermediate ring 4 further to seal with the radially inner and outer peripheral surfaces 21 and 22 of the annular oil seal groove 2, a seal element 44 made of rubber or synthetic resin is provided with the inner and outer peripheral surfaces 42 and 43 of the intermediate ring 4 contacting the inner and outer peripheral surfaces 21 and 22 of the oil seal groove 2. Further, the seal element 44 portion contacting the spring 5 is coupled by adhesive, etc., with a reinforcement ring 45 made of metal such as steel, etc., so as to solve the problem of wear due to the pressure contact of the spring. It is very advantageous in sealing of the oil to shape the seal element 44 as shown in FIG. 2, because the urging force onto the inner and outer peripheral surfaces 21 and 22 of the oil seal groove 2 increases.

Figure 2:
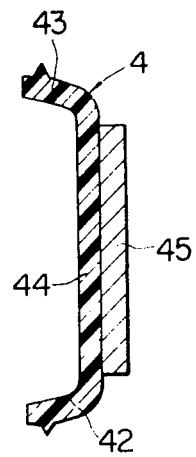
FIGS. 2 to 6 are enlarged, longitudinal, sectional views of the part of various embodiments of the intermediate rings used in the oil seal device of the present invention. Like elements carry like numerals.
Figure 3:
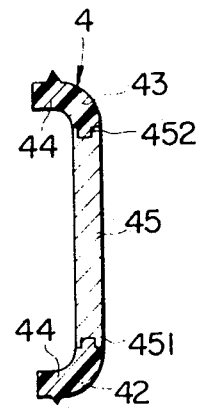
Figure 4:
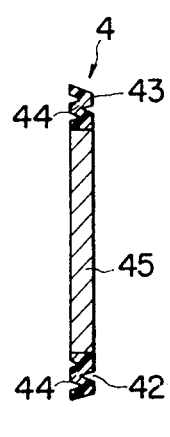
Figure 5:
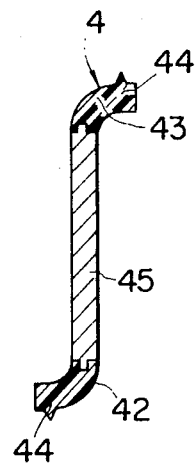

Even if the seal element 44, FIG. 3, carries separately formed inner and outer peripheral portions 451 and 452 of the reinforcement ring 43 by use of recessed and raised portions, the effect is the same as that shown in FIG. 2. Further, one may obtain preferable results in sealing of the oil by forming the seal element 44 wavy as shown in FIG. 4, because a radial spring nature is produced. It also improves the sealing function to form the inner and outer peripheral portions 42 and 43 of the intermediate ring 4 as shown in FIG. 5 such that they are bent in opposite directions because hydraulic pressure at the inner peripheral side of the oil seal device may be effectively utilized.

It should be understood from the foregoing description that since in the oil seal device of the present invention the seal element is formed at least between the body of the oil seal and the spring of rubber or synthetic resin as to the inner and outer peripheral portions, so as to seal therebetween, it effects simple and positive sealing of the oil, and accordingly it is very advantageous in comparison with the conventional devices. Further, it should also be understood that since the force of the spring is transmitted through the intermediate ring to the oil seal body, the force of the spring transmitted to the body of the oil seal becomes uniform so as to reduce the leakage of the oil.

Figure 6:
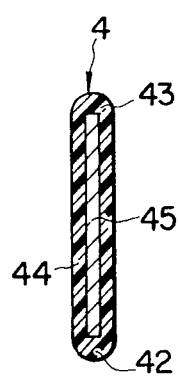

In an engine having small spring tension, even if the rubber or synthetic resin is formed on all surfaces of the reinforcement ring 43 to form the seal element 42 as shown in FIG. 6, there is no fear of wear, and accordingly, it may be used without difficulty.

Figure 7:
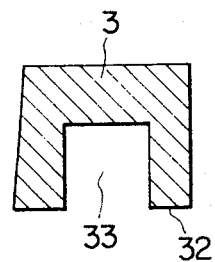
FIG. 7 is a sectional view of another embodiment of the body of the oil seal for the seal shown in FIG. 1.

The shape of the oil seal body 3 is not limited to the shape shown in FIG. 1, but as shown in FIG. 7, it may also have a recess groove 33 on the inner peripheral surface 32 without departing the scope of the present invention, and if formed, as shown in FIG. 7, slight flexibility is produced in the oil seal body 3 itself, in case that the intermediate ring is provided between the rear surface of the oil seal body and the spring in the oil seal device, the followability of the device to the inner wall of the side housing is improved, and accordingly, further effective oil sealing performance may be expected.

What is claimed is:

1. In an oil seal device for a rotary piston internal combustion engine having a rotor formed with one or more annular oil seal grooves within the rotor sidewall, an oil seal body within said groove, and a spring disposed within the bottom of the oil seal groove of said rotor facing said oil seal body, the improvement comprising:

an intermediate ring provided with seal means on at least the radially inner and outer periphery thereof relative to the rotor axis disposed within said groove, between the rear surface of the oil seal body and said spring.

2. The oil seal device as set forth in claim 1, wherein said seal means is formed of rubber or synthetic resin.

3. The oil seal device as set forth in claim 1, further comprising a reinforcement ring made of metal formed on the intermediate ring for preventing said intermediate ring from wearing.

4. The oil seal device as set forth in claim 1, wherein said seal means includes separate inner and outer peripheral seal portions, with said portions engaging said reinforcement ring by means of an interlocking recess and raised portion on respective members.

5. The oil seal device as set forth in claim 1, wherein said seal means comprises inner and outer peripheral seal portions in the form of wavy resilient members.

6. The oil seal device as set forth in claim 1, wherein said seal means comprises inner and outer peripheral portions of said intermediate ring which are directed oppositely to each other relative to the top and bottom of said groove.

7. The oil seal device as set forth in claim 1, wherein rubber or synthetic resin covers the complete surface of said reinforcement ring.

8. The oil seal device as set forth in claim 1, wherein said oil seal body is U-shape in section defined by a groove inon the inner peripheral surface thereof.

* * * * *